(12) United States Patent
Lam et al.

(10) Patent No.: US 11,157,496 B2
(45) Date of Patent: Oct. 26, 2021

(54) PREDICTIVE DATA DISTRIBUTION FOR PARALLEL DATABASES TO OPTIMIZE STORAGE AND QUERY PERFORMANCE

(71) Applicant: INTERNATIONAL BUSINESS MACHINES CORPORATION, Armonk, NY (US)

(72) Inventors: Yet-San Lam, Toronto (CA); Malcolm Singh, Markham (CA)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 15/996,154

(22) Filed: Jun. 1, 2018

(65) Prior Publication Data

US 2019/0370372 A1    Dec. 5, 2019

(51) Int. Cl.
*G06F 16/27* (2019.01)
*G06F 16/2453* (2019.01)
*G06F 16/248* (2019.01)
*G06F 16/22* (2019.01)

(52) U.S. Cl.
CPC .... *G06F 16/24537* (2019.01); *G06F 16/2282* (2019.01); *G06F 16/248* (2019.01); *G06F 16/24532* (2019.01); *G06F 16/27* (2019.01)

(58) Field of Classification Search
CPC ............... G06F 16/221; G06F 16/2282; G06F 16/24532; G06F 16/2471; G06F 16/27; G06F 16/278
See application file for complete search history.

(56) References Cited

U.S. PATENT DOCUMENTS

| 5,121,494 | A | 6/1992 | Dias et al. |
| 5,878,409 | A | 3/1999 | Baru et al. |
| 5,970,495 | A | 10/1999 | Baru et al. |
| 5,987,462 | A | 11/1999 | Kasao et al. |
| 7,185,003 | B2 | 2/2007 | Bayliss et al. |
| 9,563,648 | B2 | 2/2017 | Welton et al. |

(Continued)

FOREIGN PATENT DOCUMENTS

CA    2159269 C    11/2000

OTHER PUBLICATIONS

"List of IBM Patents or Applications Treated as Related," 2 pages.

*Primary Examiner* — Robert W Beausoliel, Jr.
*Assistant Examiner* — Nirav K Khakhar
(74) *Attorney, Agent, or Firm* — Conley Rose, P.C.

(57) ABSTRACT

A computer-implemented method for balancing storage utilization and query processing in a distributed database. In one embodiment, the computer-implemented method receives a set of queries to perform on a database that is distributed among a plurality of nodes. The database includes a plurality of data tables that each includes a plurality of columns and a plurality of rows. The computer-implemented method determines a uniqueness score and a join score for each column of each data table in the database based on the set of queries. The computer-implemented method determines a new distribution key based on the uniqueness score and the join score for each column of each data table in the database. The computer-implemented method recreates the plurality of data tables of the database on the plurality of nodes using the new distribution key for execution of the set of queries.

20 Claims, 6 Drawing Sheets

(56) References Cited

U.S. PATENT DOCUMENTS

| | | | |
|---|---|---|---|
| 10,282,350 B1* | 5/2019 | Pathak | G06F 16/2282 |
| 2005/0234841 A1* | 10/2005 | Miao | G06F 16/24537 |
| 2008/0250057 A1* | 10/2008 | Rothstein | G06F 16/20 |
| 2012/0109888 A1 | 5/2012 | Zhang et al. | |
| 2015/0032684 A1* | 1/2015 | Gupta | G06F 16/2228 |
| | | | 707/600 |
| 2015/0363443 A1* | 12/2015 | Kaushik | G06F 16/1734 |
| | | | 707/723 |
| 2015/0379057 A1* | 12/2015 | Wang | G06F 16/284 |
| | | | 707/723 |
| 2017/0286436 A1 | 10/2017 | Neporada et al. | |
| 2018/0018579 A1* | 1/2018 | Xu | G06N 20/20 |
| 2018/0253479 A1* | 9/2018 | Kudo | G06F 16/254 |

* cited by examiner

124A DISTRIBUTION KEY
128

| | COLUMN 1 | COLUMN 2 | COLUMN 3 | COLUMN 4 |
|---|---|---|---|---|
| ROW 1 | | | | |
| ROW 4 | | | | |
| ROW 7 | | | | |
| ROW 10 | | | | |

124B DISTRIBUTION KEY
128

| | COLUMN 1 | COLUMN 2 | COLUMN 3 | COLUMN 4 |
|---|---|---|---|---|
| ROW 2 | | | | |
| ROW 5 | | | | |
| ROW 8 | | | | |
| ROW 11 | | | | |

124Z DISTRIBUTION KEY
128

| | COLUMN 1 | COLUMN 2 | COLUMN 3 | COLUMN 4 |
|---|---|---|---|---|
| ROW 3 | | | | |
| ROW 6 | | | | |
| ROW 9 | | | | |
| ROW 12 | | | | |

PREDICTIVE DATA DISTRIBUTION FOR PARALLEL DATABASES TO OPTIMIZE STORAGE AND QUERY PERFORMANCE

BACKGROUND

The present disclosure relates generally to distributed database systems. A distributed database is a database in which portions of the database is distributed among multiple database nodes.

SUMMARY

In one aspect, the disclosed embodiments include a computer-implemented method performed by a system for balancing storage utilization and query processing in a distributed database. In one embodiment, the computer-implemented method receives a set of queries to perform on a database that is distributed among a plurality of nodes. The database includes a plurality of data tables each having a plurality of columns and a plurality of rows. The computer-implemented method determines a uniqueness score for each column of each data table in the database. The computer-implemented method determines a join score for each column of each data table in the database based on the set of queries. The computer-implemented method determines a new distribution key based on the uniqueness score and the join score for each column of each data table in the database. The computer-implemented method recreates the plurality of data tables of the database on the plurality of nodes using the new distribution key for execution of the set of queries.

In another aspect, the disclosed embodiments include a system configured to balancing storage utilization and query processing in a distributed database. The system includes memory for storing instructions, and a processor configured to execute the instructions to receive a set of queries to perform on a database that is distributed among a plurality of nodes, the database comprising a plurality of data tables, where each data table comprises a plurality of columns and a plurality of rows; determine a uniqueness score for each column of each data table in the database; determine a join score for each column of each data table in the database based on the set of queries; determine a new distribution key based on the uniqueness score and the join score for each column of each data table in the database; recreate the plurality of data tables of the database on the plurality of nodes using the new distribution key; execute the set of queries using the recreated database; and display information requested by a user using the results of the set of queries.

In another aspect, the disclosed embodiments include a computer program product comprising a computer readable storage medium having program instructions embodied therewith, the program instructions executable by a processor. Executing the program instructions causes the processor to receive a set of queries to perform on a database that is distributed among a plurality of nodes, the database comprising a plurality of data tables, where each data table comprises a plurality of columns and a plurality of rows; determine a uniqueness score for each column of each data table in the database; determine a join score for each column of each data table in the database based on the set of queries; determine a new distribution key based on the uniqueness score and the join score for each column of each data table in the database; recreate the plurality of data tables of the database on the plurality of nodes using the new distribution key; execute the set of queries using the recreated database; and display information requested by a user using the results of the set of queries.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram illustrating a typical data table distribution in accordance with an embodiment of the present disclosure.

Figure 1:
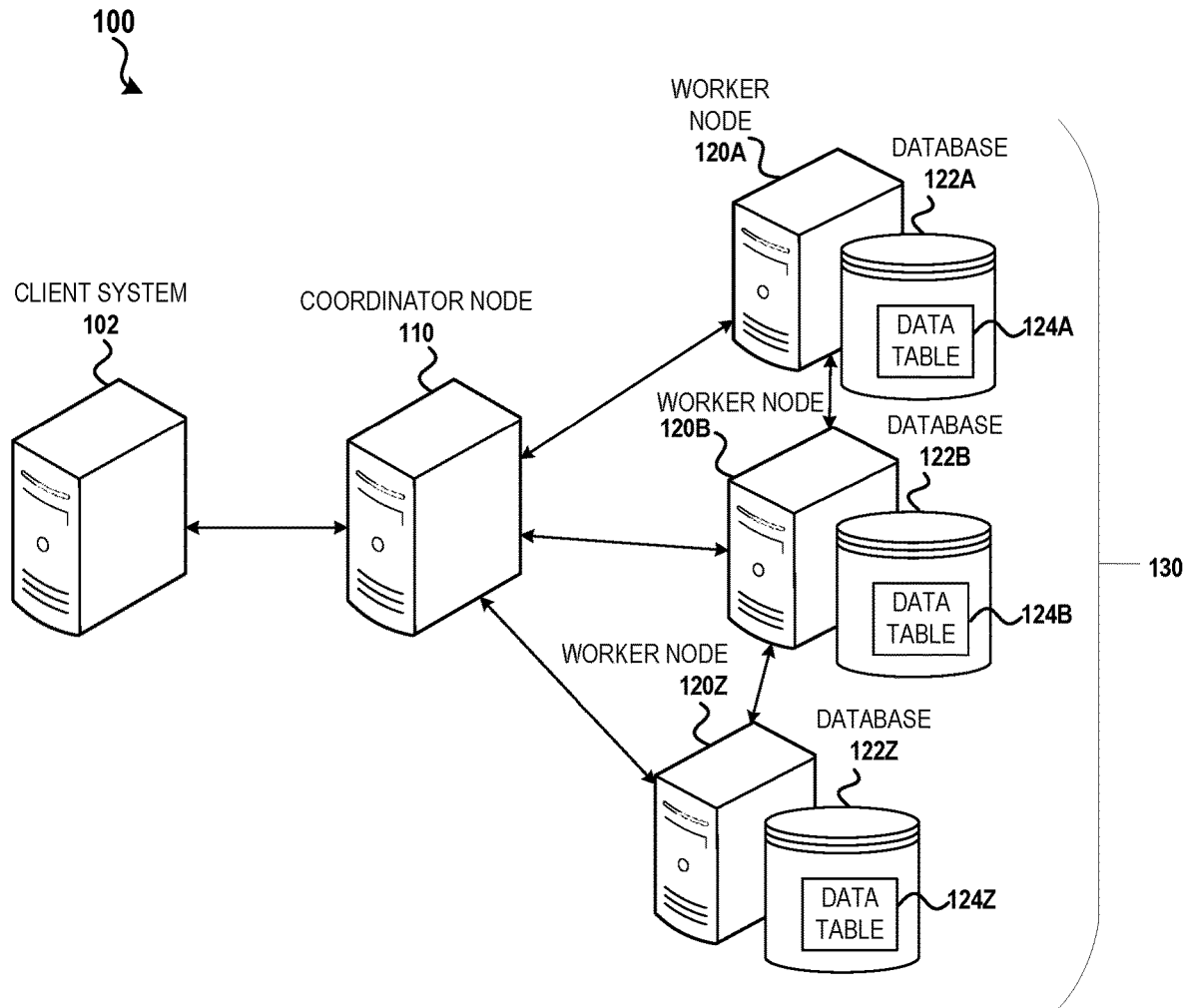
FIG. 1 is a schematic diagram illustrating a parallel database system in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicatively coupled" means capable of sending and/or receiving data over a communication link. The communication link may include both wired and wireless links, and may be a direct link or may comprise of multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

FIG. 1 is a schematic diagram illustrating a parallel database system 100 in accordance with an embodiment of the present disclosure. In the depicted embodiment, the parallel database system 100 includes a client system 102 that is communicatively coupled a coordinator node 110. The coordinator node 110 is communicatively coupled to a plurality of worker nodes 120a, 120b, [ . . . ], 120z, each comprising a corresponding database 122a, 122b, [ . . . ], 122z that is configured to store data table 124a, 124b, [ . . . ], 124z to form a distributed database 130. Data table 124a, 124b, [ . . . ], 124z are configured to store the table data of the distributed database 130. In other words, the storage of the data of the distributed database 130 is divided among the plurality of worker nodes 120.

In one embodiment, the coordinator node 110 is configured to act as a master node that interacts with the worker nodes 120 to fulfill a request from the client system 102. In an alternative embodiment, the coordinator node 110 may be excluded from the parallel database system 100. In these embodiments, the role of the coordinator node 110 may be assigned to one of the plurality of worker nodes 120. Additionally, in certain embodiments, the plurality of worker nodes 120 may be communicatively coupled to each other. Although only three worker nodes 120 are illustrated, the parallel database system 100 may include any number of worker nodes 120 that form the distributed database 130.

In a parallel computing database environment such as that illustrated in FIG. 1, the table data of the distributed database 130 are typically distributed across the plurality of worker nodes 120 in a uniform manner. A common method to distribute the table data is based on the value of a chosen table column for each row, which is referred to as the distribution key. The current practice usually favors distributing data uniformly across the nodes by choosing the column with the most unique values. If the data is not uniformly distributed, this is referred to as data skew. If the data is skewed (i.e., if the rows for a data table 124 are not evenly distributed across the worker nodes 120), a worker node 120 with more rows in its data table will have to perform more work than other worker nodes 120 with less rows when performing a query on the distributed database 130.

FIG. 2 illustrates an example of uniform data distribution of the distributed database 130 among the plurality of worker nodes 120a, 120b, [ . . . ], 120z in accordance with an embodiment of the present disclosure. In particular, FIG. 2 illustrates an example of the data tables 124a, 124b, and 124z of FIG. 1. In the depicted embodiment, the first column is selected as the distribution key 128 because it contains the most unique values. Rows of the distributed database 130 (e.g., a table comprising 12 rows by 4 columns) are then distributed evenly among the plurality of worker nodes 120 such that the data tables 124a, 124b, and 124z each have the same or close to the same number of rows (e.g., in the case that the rows of the database 130 cannot be evenly divided among the plurality of worker nodes 120, it is possible that a data table 124 may include one more or one less row than another data table 124 if the data is distributed in a round robin type manner). For simplicity purposes, each of the depicted data tables 124a, 124b, and 124z includes four columns and four rows. However, it should be understood that the data tables 124a, 124b, and 124z may include any number of columns and any number of rows depending on the size of the table of the distributed database 130 (e.g., there may be hundreds or thousands of rows).

Distributing the data in the manner as illustrated in FIG. 2 ensures that each worker node 120 has approximately the same amount of data makes sense from a data storage utilization perspective to prevent data skew. However, this form of data distribution does not take into consideration how the data is being used during processing (i.e., during a query). For instance, although the data is evenly distributed, there still may be a processing skew that can affect the query performance. Processing skew means that the data is not stored in a manner that enables efficient performance of a set of queries such that more work is being performed by certain worker nodes than other worker nodes. For example, although the data may be distributed evenly, a particular worker node may have to perform an uneven amount of work depending on the queries being executed or the execution of the queries may not be optimal as if the tables were collocated. This will result in processing overhead. To address both the issue of data skew and processing skew, the disclosed embodiments include systems and computer-implemented methods that are configured to perform predictive data distribution for parallel databases to identify the optimal distribution key that optimizes both storage and query performance.

Figure 3:
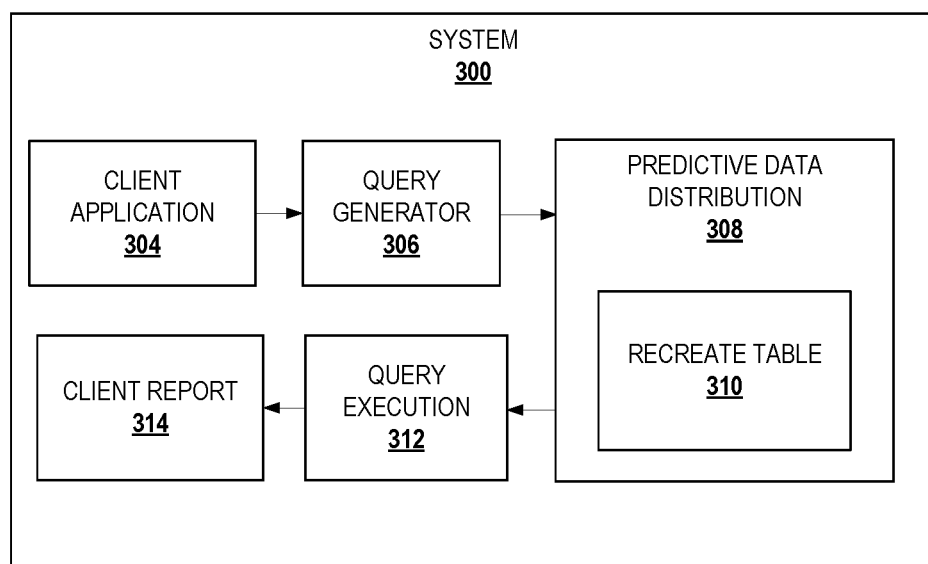
FIG. 3 is a schematic diagram illustrating a system for performing predictive data distribution for parallel databases in accordance with an embodiment of the present disclosure.

FIG. 3 illustrates an example a system 300 that is configured to perform predictive data distribution for parallel databases to identify the optimal distribution key for optimizing both storage and query performance in accordance with an embodiment of the present disclosure. In one embodiment, the system 300 may be an example of a client system such as the client system 102 in FIG. 1. In the depicted embodiment, the system 300 includes a client application module 304, a query generator module 306, a predictive data distribution module 308, a recreate table module 310, a query execution module 312, and a client reporting module 314.

In one embodiment, the client application module 304 includes software code, data parameters, user profiles, and configuration settings of a client application. The client application may be any type of application such as, but not limited to, accounting applications, a sales/commission tracking applications, a work document management applications, analytics software, reporting applications, and inventory applications. The client application is configured to enable a user to specify the conditions or parameters of a search that is performed on the data stored in a distributed database such as distributed database 130. As a non-limiting example, the application may enable a user to select or specify via a user interface the names of employees, date ranges, a list of products, salary or commissions amounts related to each product, or other parameters for performing a search on the data stored in a distributed database to determine a bonus amount to be paid to each of the employees.

In one embodiment, the query generator module 306 is configured to generate a set of queries based on the parameters selected or entered by a user. The set of queries may be generated using any type of querying language such as, but not limited to, Structured Query Language (SQL). SQL is a standard computer language for relational database management and data manipulation. SQL is used to query, insert, update, and modify data. For example, the query generator module 306 may generate the SQL query: SELECT * FROM A JOIN B ON A.COL1=B.COL2 to perform a select operation. Most relational databases support SQL. In various embodiments, the set of queries may comprise of hundreds, thousands, or any number of queries to be executed.

In one embodiment, the predictive data distribution module 308 includes computer-executable code configured to identify the optimal distribution key for optimizing both storage and query performance. One method for identifying the optimal distribution key for optimizing both storage and query performance is described below in FIG. 4. Once the optimal distribution key is determined by the predictive data distribution module 308, the recreate table module 310 is configured to re-distribute the table data of the distributed database using the optimal distribution key as the new distribution key.

The query execution module 312 then executes the set of queries using the redistributed database. The results of the queries are passed to the client reporting module 314, which is configured to present the information requested by the user using the results of the set of queries. For example, the client reporting module 314 may be configured to perform certain calculations using the results of the set of queries and present the requested information in the form of a spreadsheet.

Figure 4:
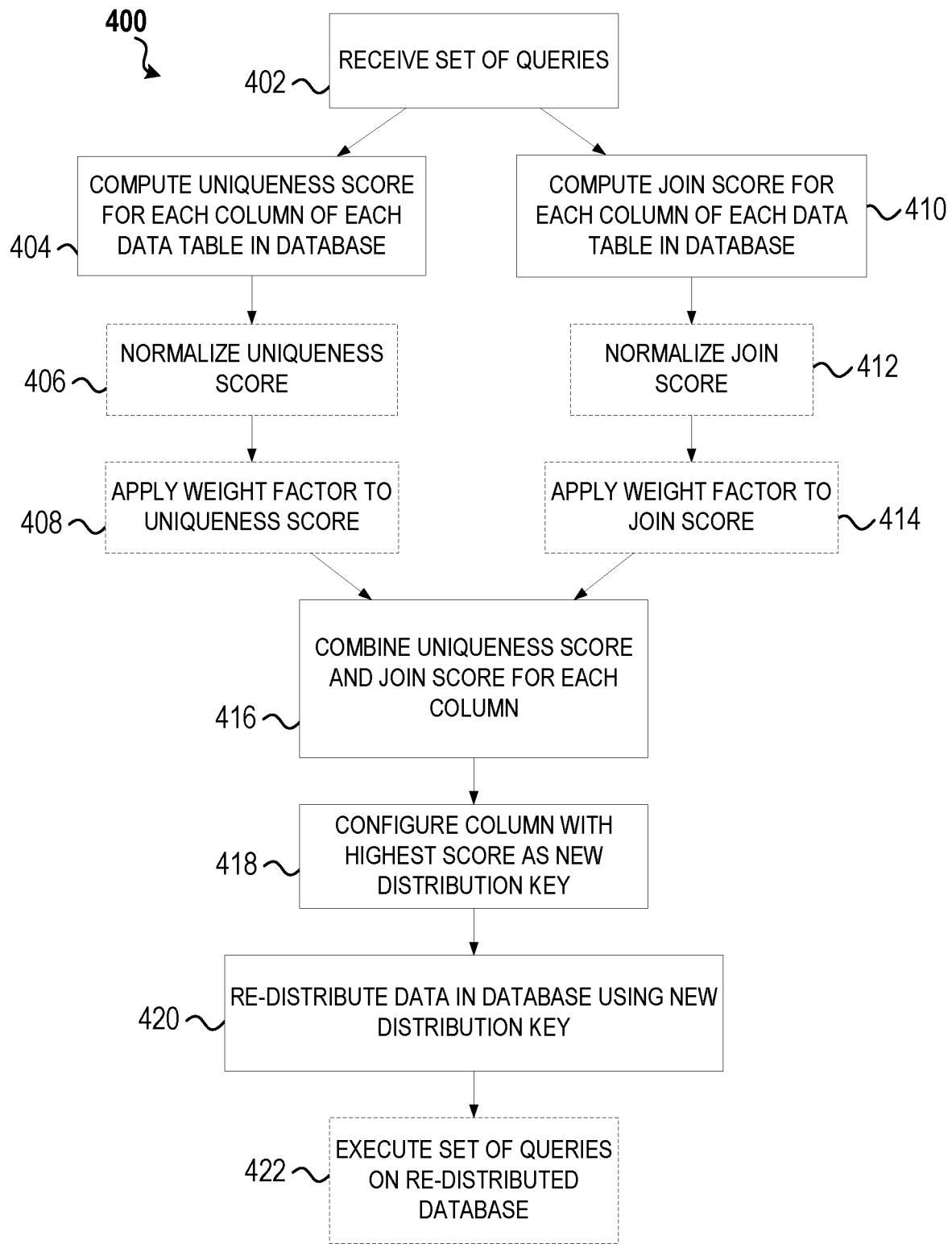
FIG. 4 is flowchart illustrating a process for performing predictive data distribution for parallel databases in accordance with an embodiment of the present disclosure.

FIG. 4 is a flowchart illustrating a process 400 for performing predictive data distribution for parallel databases to optimize storage and query performance in accordance with an embodiment of the present disclosure. In one embodiment, the process 400 may be implemented using software instruction that is executed by the system 300 of FIG. 3. The process 400 begins, at step 402, by receiving a set of queries. In one embodiment, the set of queries may be generated based on a set of parameters specified by a user or other system. In the depicted embodiment, the process 400 is configured to compute a uniqueness score, at step 404, and a join score, step 410, for each column of each data table in the distributed database. In one embodiment, the uniqueness score is a count of a number of distinct values in a column, which indicates the degree of uniqueness of the entries in each column. For example, in one embodiment, if all the entries in a column are different, then the highest uniqueness score is assigned to that column. The join score indicates how often the column is used in a JOIN operation/clause in the set of queries. A JOIN clause combines columns from one or more tables in a relational database by using values common to each column. In this particular embodiment, the JOIN operation is used to compute a join score because the JOIN operation is computationally more expensive to perform in a distributed database where the tables are not collocated, particularly as the number of records increases. However, in various other embodiments, a score may be computed using a different query operation in place of, or in addition to, the JOIN operation.

In accordance with one embodiment, the process 400 is configured to normalize the uniqueness score, at step 406, for each column to obtain a value between 0 and 1. For example, in one embodiment, a normalized uniqueness score may be generated by using the equation 1-(1/uniqueness score) to generate a value between 0 and 1, where a value closer to 1 indicates that the column contains more unique elements. Similarly, in one embodiment, the process 400 is configured to normalize the join score, at step 406, for each column using the equation 1-(1/join score) to generate a value between 0 and 1. A value closer to 1 indicates that the column is used in a higher number of join operations. By having normalized uniqueness and join scores, the significance of a join score of five would not be lost when added or compared to a uniqueness score of a one million.

Additionally, in some embodiments, the process 400, at step 408, may apply a weight factor to the normalized uniqueness score. The process 400, at step 414, may also apply a weight factor to the normalized join score. For example, in one embodiment, both the normalized uniqueness score and the normalized join score are multiplied by a one-half (0.5) weight factor. In other embodiments, a different weight factor may be applied to each of the normalized uniqueness score and the normalized join score. For example, in one embodiment, a 0.6 weight factor may be applied to the normalized uniqueness score and a 0.4 weight factor may be applied to the normalized join score in the case that the predictive data distribution is configured to favor less data distribution skew over processing skew. Likewise, a larger weight factor may be applied to the normalized join score than the weight factor of the normalized uniqueness score if the predictive data distribution is configured to favor less processing skew over data distribution skew.

At step 410, the process 400 is configured to combine the normalized uniqueness score and the normalized join score for each column together. In the embodiment where both the normalized uniqueness score and the normalized join score are multiplied by a one-half (0.5) weight factor, the combined score will be a value between 0 and 1. A column with a combined score closest to 1 indicates that the column provides the best balance between distribution skew and processing skew and is configured, at step 418, as the new distribution key. The process 400, at step 420, re-distributes or recreates the data tables in the database using the new distribution key. At step 422, the process 400 executes the set of queries on the redistributed database. The process 400 terminates thereafter.

Figure 5:
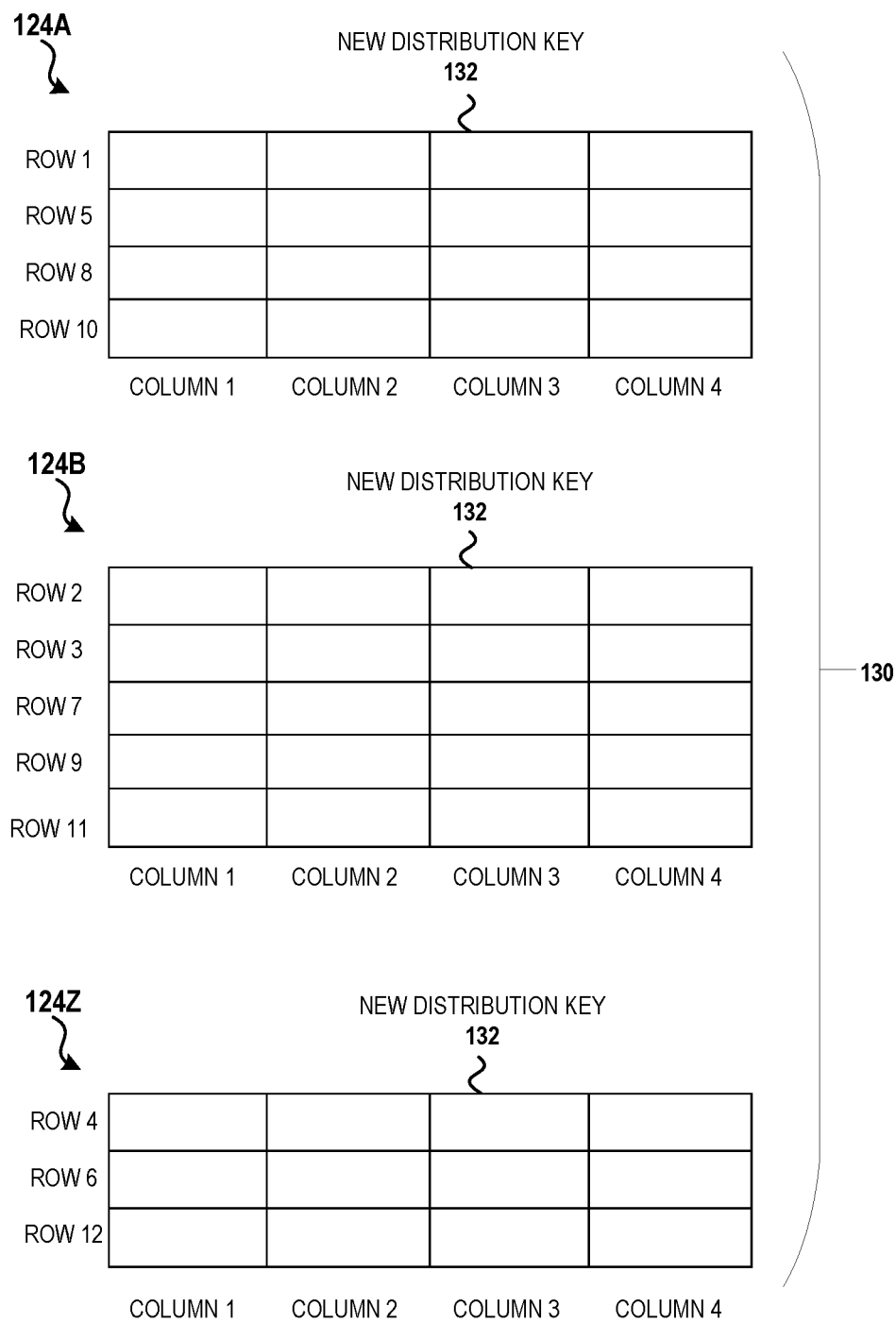
FIG. 5 is a schematic diagram illustrating data table redistribution in accordance with an embodiment of the present disclosure.

FIG. 5 illustrates an example of a redistribution of data of the distributed database 130 of FIG. 2 in accordance with an embodiment of the present disclosure. In the depicted example, a new distribution key 132 is determined using the above embodiments. The data in the distributed database 130 is then redistributed using the new distribution key 132. As depicted in the example in FIG. 5, using the new distribution key 132, the data may not be evenly distributed among the data tables 124a, 124b, and 124z. Additionally, different rows of the table data of the distributed database 130 may be stored together at a particular worker node than that shown in FIG. 2 using the new distribution key 132. For example, in the depicted example, the data tables 124*a* includes four rows of data, data tables 124*b* includes five rows of data, and data tables 124*z* includes three rows of data. However, this data distribution balances data distribution with query processing for optimizing execution of a set of queries associated with a user's request.

Figure 6:
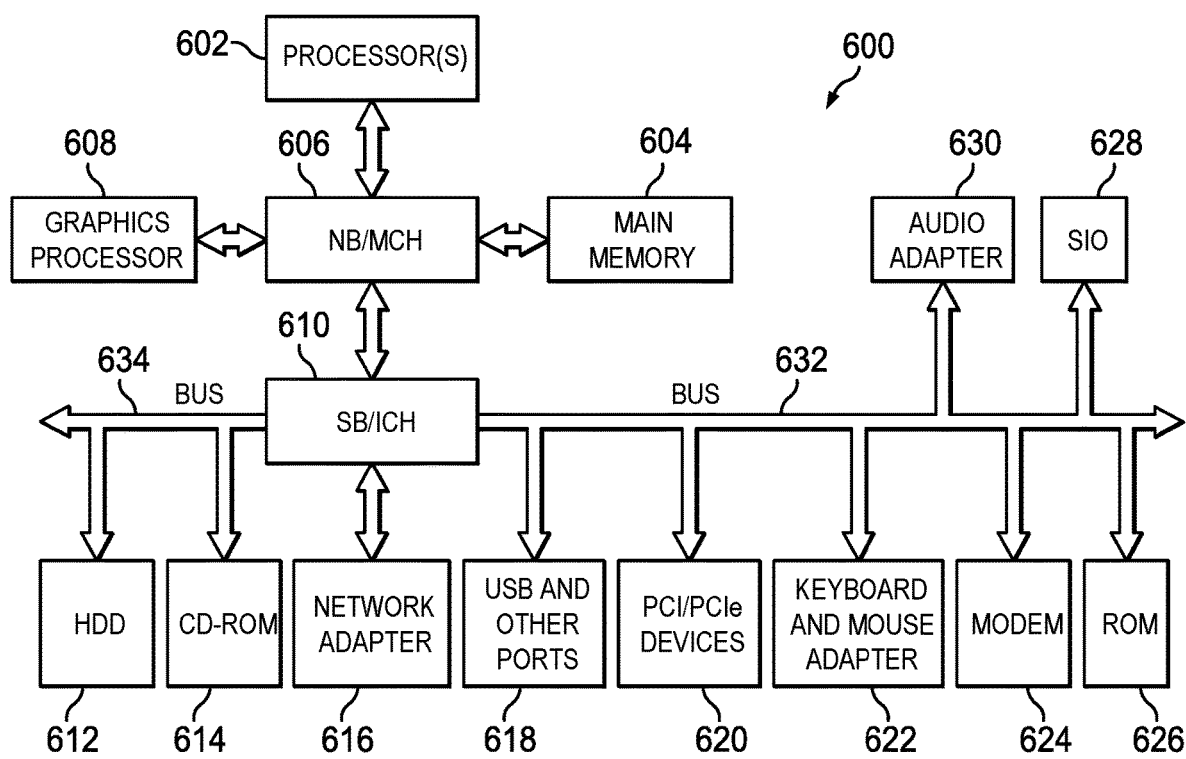
FIG. 6 is a block diagram illustrating a hardware architecture of a system according to an embodiment of the present disclosure.

FIG. 6 is a block diagram illustrating a hardware architecture of a system 600 according to an embodiment of the present disclosure in which aspects of the illustrative embodiments may be implemented. For example, in one embodiment, the client system 102 or the worker nodes 120*a*, 120*b*, and 120*z* of FIG. 1 may be implemented using the data processing system 600. Additionally, the data processing system 600 may be configured to store and execute instructions for performing the process described in FIG. 3. In the depicted example, the data processing system 600 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP). A computer bus, such as bus 632 or bus 634, may be implemented using any type of communication fabric or architecture that provides for a transfer of data between different components or devices attached to the fabric or architecture.

In the depicted example, network adapter 616 connects to SB/ICH 610. Audio adapter 630, keyboard and mouse adapter 622, modem 624, read-only memory (ROM) 626, hard disk drive (HDD) 612, compact disk read-only memory (CD-ROM) drive 614, universal serial bus (USB) ports and other communication ports 618, and peripheral component interconnect/peripheral component interconnect express (PCI/PCIe) devices 620 connect to SB/ICH 610 through bus 632 and bus 634. PCI/PCIe devices may include, for example, Ethernet adapters, add-in cards, and personal computing (PC) cards for notebook computers. PCI uses a card bus controller, while PCIe does not. ROM 626 may be, for example, a flash basic input/output system (BIOS). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. In some embodiments, HDD 612 may be replaced by other forms of data storage devices including, but not limited to, solid-state drives (SSDs). A super I/O (SIO) device 628 may be connected to SB/ICH 610. SIO device 628 may be a chip on the motherboard that is configured to assist in performing less demanding controller functions for the SB/ICH 610 such as controlling a printer port, controlling a fan, and/or controlling the small light emitting diodes (LEDS) of the data processing system 600.

The data processing system 600 may include a single processor 602 or may include a plurality of processors 602. Additionally, processor(s) 602 may have multiple cores. For example, in one embodiment, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600 in FIG. 6. Various applications and services may run in conjunction with the operating system. Instructions for the operating system, applications, and other data are located on storage devices, such as one or more HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for balancing storage utilization and query processing in a distributed database, the computer-implemented method comprising:
   receiving a set of queries to perform on a database that is distributed among a plurality of nodes, the database comprising a plurality of data tables, where each data table comprises a plurality of columns and a plurality of rows;
   determining a uniqueness score for each column of each data table in the database;
   determining a join score for each column of each data table in the database based on the set of queries;
   determining a new distribution key based on the uniqueness score and the join score for each column of each data table in the database; and
   recreating the plurality of data tables of the database on the plurality of nodes using new distribution key.

2. The computer-implemented method of claim 1, further comprising:
   executing the set of queries using the recreated database; and
   displaying information requested by a user using results generated by executing the set of queries.

3. The computer-implemented method of claim 1, wherein the uniqueness score is a count of a number of distinct values in a column.

4. The computer-implemented method of claim 3, further comprising normalizing the uniqueness score to generate a normalized uniqueness score having a first value between zero and one, wherein one indicates that a highest level of uniqueness and zero indicates a lowest level of uniqueness.

5. The computer-implemented method of claim 4, wherein the join score is a count of a number of times the column is used in a join operation in the set of queries.

6. The computer-implemented method of claim 5, further comprising normalizing the join score to generate a normalized join score having a second value between zero and one, wherein one indicates that a highest level of join operations and zero indicates a lowest level of join operations.

7. The computer-implemented method of claim 6, further comprising multiplying both the normalized uniqueness score and the normalized join score by a weight factor to produce a weighted uniqueness score and a weighted join score.

8. The computer-implemented method of claim 7, wherein the weight factor is the same for the weighted uniqueness score and the weighted join score.

9. The computer-implemented method of claim 8, wherein the weight factor is one-half.

10. The computer-implemented method of claim 9, further comprising combining the weighted uniqueness score and the weighted join score to generate a combined uniqueness-join score.

11. The computer-implemented method of claim 10, wherein determining the new distribution key based on the uniqueness score and the join score for each column of each data table in the database comprises selecting the column with a highest combined uniqueness-join score as the new distribution key.

12. A system configured to balance storage utilization and query processing in a distributed database, the system comprising memory for storing instructions, and a processor configured to execute the instructions to:
receive a set of queries to perform on a database that is distributed among a plurality of nodes, the database comprising a plurality of data tables, where each data table comprises a plurality of columns and a plurality of rows;
determine a uniqueness score for each column of each data table in the database;
determine a join score for each column of each data table in the database based on the set of queries;
determine a new distribution key based on the uniqueness score and the join score for each column of each data table in the database;
recreate the plurality of data tables of the database on the plurality of nodes using the new distribution key;
execute the set of queries using the recreated database; and
display information requested by a user using results generated by executing the set of queries.

13. The system of claim 12, wherein the processor further executes instructions to:
normalize the uniqueness score to generate a normalized uniqueness score having a first value between zero and one, wherein one indicates that a highest level of uniqueness and zero indicates a lowest level of uniqueness; and
normalize the join score to generate a normalized join score having a second value between zero and one, wherein one indicates that a highest level of join operations and zero indicates a lowest level of join operations.

14. The system of claim 13, wherein the processor further executes instructions to multiply the normalized uniqueness score and the normalized join score by a weight factor to produce a weighted uniqueness score and a weighted join score.

15. The system of claim 14, wherein the processor further executes instructions to combine the weighted uniqueness score and the weighted join score to generate a combined uniqueness-join score.

16. The system of claim 15, wherein the processor further executes instructions to select a column with a highest combined uniqueness-join score as the new distribution key.

17. A computer program product for balancing storage utilization and query processing in a distributed database, the computer program product comprising a computer readable storage medium having program instructions embodied therewith, the program instructions executable by a processor to cause the processor to:
receive a set of queries to perform on a database that is distributed among a plurality of nodes, the database comprising a plurality of data tables, where each data table comprises a plurality of columns and a plurality of rows;
determine a uniqueness score for each column of each data table in the database;
determine a join score for each column of each data table in the database based on the set of queries;
determine a new distribution key based on the uniqueness score and the join score for each column of each data table in the database;
recreate the plurality of data tables of the database on the plurality of nodes using the new distribution key;
execute the set of queries using the recreated database; and
display information requested by a user using results generated by executing the set of queries.

18. The computer program product of claim 17, wherein the program instructions executable by the processor further includes instructions to:
normalize the uniqueness score to generate a normalized uniqueness score having a first value between zero and one, wherein one indicates that a highest level of uniqueness and zero indicates a lowest level of uniqueness; and
normalize the join score to generate a normalized join score having a second value between zero and one, wherein one indicates that a highest level of join operations and zero indicates a lowest level of join operations.

19. The computer program product of claim 18, wherein the program instructions executable by the processor further includes instructions to multiply the normalized uniqueness score and the normalized join score by a weight factor to produce a weighted uniqueness score and a weighted join score.

20. The computer program product of claim 19, wherein the program instructions executable by the processor further includes instructions to:
combine the weighted uniqueness score and the weighted join score to generate a combined uniqueness-join score; and
select a column with a highest combined uniqueness-join score as the new distribution key.

* * * * *